United States Patent [19]

Roeder et al.

[11] 4,200,871
[45] Apr. 29, 1980

[54] ACQUISITION SYSTEM FOR CONTINUOUS-WAVE FREQUENCY MODULATION OBJECT DETECTOR

[75] Inventors: Robert S. Roeder, Dunedin, Fla.; Lucien C. Bomar, II, Marietta, Ga.

[73] Assignee: Sperry Corporation, New York, N.Y.

[21] Appl. No.: 906,291

[22] Filed: May 15, 1978

Related U.S. Application Data

[63] Continuation-in-part of Ser. No. 811,110, Jun. 29, 1977, abandoned.

[51] Int. Cl.² .............................................. G01S 9/02
[52] U.S. Cl. ..................................................... 343/7.4
[58] Field of Search ................. 343/7.4, 7.5, 5 R, 759, 343/14, 757

[56] References Cited

U.S. PATENT DOCUMENTS

| | | | |
|---|---|---|---|
| 2,508,400 | 5/1950 | Kiebert, Jr. | 343/14 |
| 2,553,907 | 5/1951 | Fleming-Williams et al. | 343/14 |
| 2,605,418 | 7/1952 | Grass | 343/5 R |
| 2,698,932 | 1/1955 | Wathen | 343/7.4 |
| 2,724,825 | 11/1955 | Davenport | 343/7.4 |
| 2,929,057 | 3/1960 | Green | 343/14 |
| 3,500,403 | 3/1970 | Fuller | 343/14 |
| 3,828,348 | 8/1974 | Murray, Jr. | 343/7 A |
| 3,921,169 | 11/1975 | Lazarchik et al. | 343/7.5 |
| 4,107,679 | 8/1978 | Strauch et al. | 343/7.5 |

*Primary Examiner*—Malcolm F. Hubler
*Attorney, Agent, or Firm*—Howard P. Terry

[57] ABSTRACT

A continuous-wave frequency-modulation active radiometric target seeking device performs search, acquisition, and tracking functions. A technique is provided for target range discrimination and recognition using a pair of narrow band i.f. filters also improving both signal-to-clutter ratio and signal-to-receiver noise ratio. Target search is accomplished with simultaneous and synchronized range and antenna azimuth scanning with range bins effectively swept across the target by variably modulating the transmitted carrier frequency. Recognition of a substantially point target is achieved by a bipolar pulse discriminator responsive to the i.f. filter pair. Upon target acquisition, tracking is maintained by imposing a high frequency dither upon the modulation frequency in a closed loop control using only a single i.f. filter.

13 Claims, 17 Drawing Figures

ACQUISITION SYSTEM FOR CONTINUOUS-WAVE FREQUENCY MODULATION OBJECT DETECTOR

CROSS-REFERENCE TO RELATED APPLICATION

This is a continuation-in-part of patent application Ser. No. 811,110, filed June 29, 1977, now abandoned, and entitled "Acquisition System for Continuous-Wave Frequency Modulation Object Detector" in the names of Robert S. Roeder and Lucien C. Bomar, III and assigned to Sperry Rand Corporation.

BACKGROUND OF THE INVENTION

1. Field of the Invention

The invention pertains to radiometric devices for seeking targets against a background of high noise temperature such as that of the earth's surface and more particularly relates to radiometric systems adapted while searching to detect special characteristics of such targets, even though immersed in noisy environments, by processing received signals representative of those special characteristics and by their recognition by processing systems which include adjacent-target-range discrimination apparatus.

2. Description of the Prior Art

Radiometric target searching and tracking systems, both passive and active, are known in the art and are generally characterized by several faults making them not totally satisfactory for use in high noise level environments, such as in detecting relatively small metal objects like navigation markers or vehicles in a background of ground clutter. In particular, prior devices employing only conventional types of scanning antenna systems during search generally have a limited field of view so that search of an area of reasonable size requires an unreasonable amount of time. Furthermore, in many prior systems, the wave form emerging from the conventional demodulator system employed varies widely with the location of the target with respect to the antenna scan axis and with other factors especially including the nature and level of the background noise present. Generally, the received wave forms have no invariant characteristic by which the presence and nature of a potential target can readily be distinguished preparatory to initiating acquisition and automatic tracking of a selected target.

An advanced multiple mode object seeker system is the subject of the Lazarchik et al U.S. Pat. No. 3,921,169 for a "Multiple Mode Radiometric System with Range Detection Capability" issued Nov. 18, 1975 and assigned to Sperry Rand Corporation. This microwave radiometric system features operation selectively in passive and active modes, providing in the active mode incoherent frequency-modulated continuous wave illumination for augmenting the apparent temperature of the target and for improving the measured radiometric temperature contrast between the target and its spatial background, consequently increasing the maximum distance at which such a target may be detected. Composite noise and triangular wave frequency modulation features of a closed-loop control system cooperate to yield a constant receiver beat frequency in a system in which target range is easily derived. The Lazarchik et al system will be recognized as an interesting continuous-wave frequency-modulation radiometric system with selective passive and active modes, but it will also be readily apparent that it provides no means for reliably recognizing a target embedded in a noisy background or for cooperatively acquiring and automatically tracking such a target. In addition, the Lazarchik et al system does not assess to solve the problem of operating in a situation in which an airborne craft is flown in an essentially horizontal path with the large increase in background clutter and reduction in operating range that accompanies operation of the antenna pattern at the near grazing incident angle with respect to the earth's surface.

The problems associated with positive recognition of a navigation marker or parked vehicle, for example, at a reasonably large range are connected with the usual constraints found in object detection systems of severe background clutter, variable weather clutter and attenuation, and receiver-generated noise. The problems are further complicated with targets that are inherently stationary such as navigation markers and many kinds of military targets. Where there is no target motion with respect to the terrain, the problems are even more serious, because no improvement in signal-to-clutter ratio can result by normal methods of Doppler processing. Accordingly, there is a need not filled by the prior art to achieve maximum spatial resolution of target detection by the application of the principles of signal processing. In the present invention the problems of the prior art are overcome by apparatus wherein spatial resolution is enhanced by employing a predetermined degree of resolution in the range dimension.

SUMMARY OF THE INVENTION

The present invention relates to high frequency radiometric object detection devices for searching for and for tracking targets against the high background noise of the earth's surface. The invention constitutes a wide band radio frequency continuous-wave frequency-modulated object seeker system with improved target detection, acquisition, and tracking range capability. A technique of range discrimination is employed with narrow band i.f. filters to improve both signal-to-clutter ratio and signal-to-receiver noise ratios. This novel range bin technique uses a linear saw tooth sweep of the transmitted carrier and, after heterodyne conversion, the i.f. signal is processed through fixed-tuned narrow band filters. Wide r.f. deviation is used to illuminate the target scene in order to suppress the effects of multipath, glint, and scintillation. Reduction of both clutter and receiver noise is achieved through use of the narrow band i.f. filters, with two adjacent filters used to provide simple clutter cancellation. Target search is accomplished with simultaneous range and antenna angle scanning with the range filters in effect swept over the ground by varying the modulation frequency. Target detection is achieved with a bipolar pulse discriminator connected to the output of two adjacent range bin filters. Automatic range tracking is accomplished by injecting a high frequency dither upon the modulation frequency and by providing a range locking loop using only a single i.f. filter.

The range bin technique presents a relatively simple solution to the aforementioned difficult problem; i.e., the detection, acquisition, and tracking in a cruise trajectory even during adverse weather of targets located in typical background clutter. A single voltage-tuned semiconductor carrier oscillator employed as the transmitter also acts economically to supply local oscillator energy. The range resolution of the object seeker is comparable to that of a narrow band pulse system and the range ambiguity problem is substantially absent. The novel object detector mode may be readily combined with a passive radiometer mode in order to retain the beneficial measurement features of a totally passive system.

DESCRIPTION OF THE PREFERRED EMBODIMENTS

A basic concept employed in the continuous-wave frequency-modulated radiometric target seeking system of the present invention lies in its use of a target range discrimination device within its receiver having narrow band intermediate frequency filters to improve both the signal-to-clutter and the signal-to-receiver noise ratios of the receiver system and its consequent use of what will be referred to herein as a range bin mechanism for target discrimination. It will be understood that the target may be an energy-reflecting navigation marker or other relatively small object useful in craft navigation or may be a vehicle whose precise location is being sought, such as a tank or other military vehicle.

Figure 1:
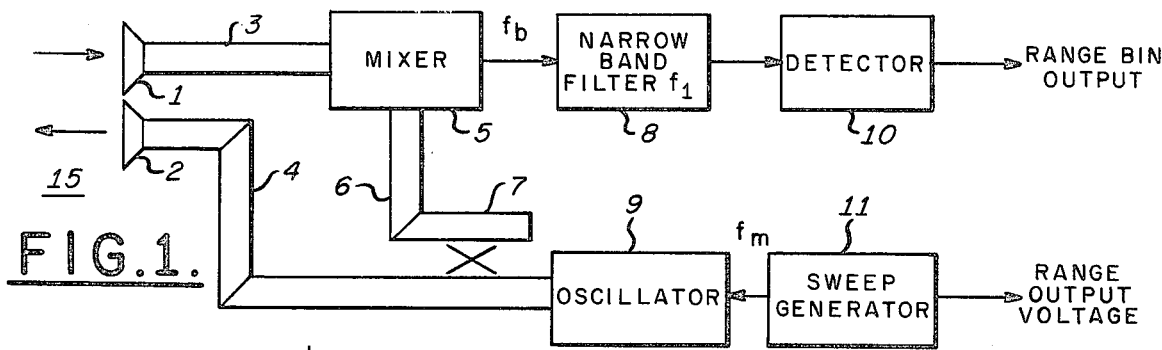
FIG. 1 is a block diagram illustrating basic features of the invention.
Figure 2:
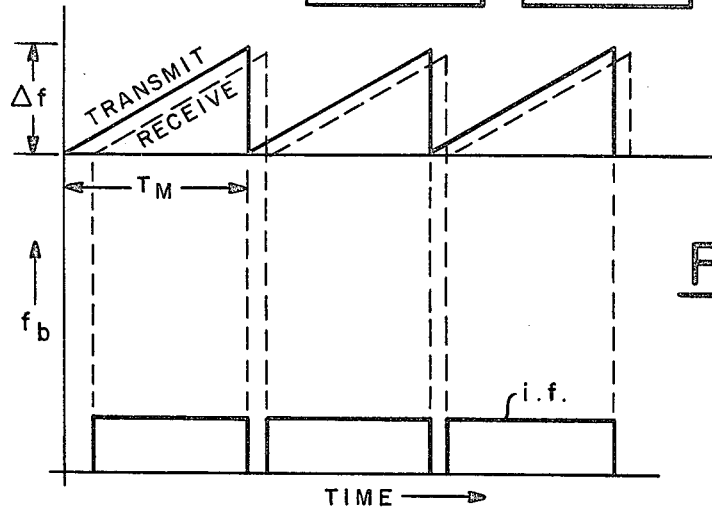
FIG. 2 presents signal wave forms useful in explaining the operation of the apparatus of FIG. 1.

The simple block diagram of FIG. 1 illustrates a transmitter and receiver system 15 according to the invention for illuminating a surface target via wave guide 4 and antenna 2, reflected energy being received by the closely adjacent antenna 1. A modulation frequency $f_m$ from sweep generator 11 is applied, for example, to a varactor-tuned Gunn diode oscillator 9 to generate a linear radio frequency saw tooth sweep $\Delta f$ as shown in FIG. 2. A sample of the energy derived by coupler 7 from oscillator 9 is heterodyned with the received signal of wave guide 3 in mixer 5 to produce a lower beat frequency $f_b$ as seen in FIG. 2. The fixed narrow band i.f. filter 8 shown in FIG. 1 acts as a range or frequency bin equivalent of the range or time gate in a conventional pulse ranging system. For a target at some arbitary range, the modulation frequency produced by sweep generator 11 is adjusted until the beat frequency output of mixer 5 applied to detector 10 is equal to the center frequency $f_1$ of narrow band filter 8. In this system, the frequency deviation $\Delta f$ and the beat frequency $f_b$ are each constant, having values, for example, of 1 GHz and 100 MHz, respectively. If the range bin is to be located at a slant range $R_S$ of 5000 feet, for example, the modulation frequency $f_m$ would be 10 KHz. The range resolution of the system is directly proportional to the slant range $R_S$ because $\Delta f$ and $f_b$ are constant, while $f_m$ is variable. The range resolution $\Delta R_S$ at 5000 feet for a radiometer system 15' is approximately 25 feet and improves as target range becomes shorter (FIG. 3).

Figure 3:
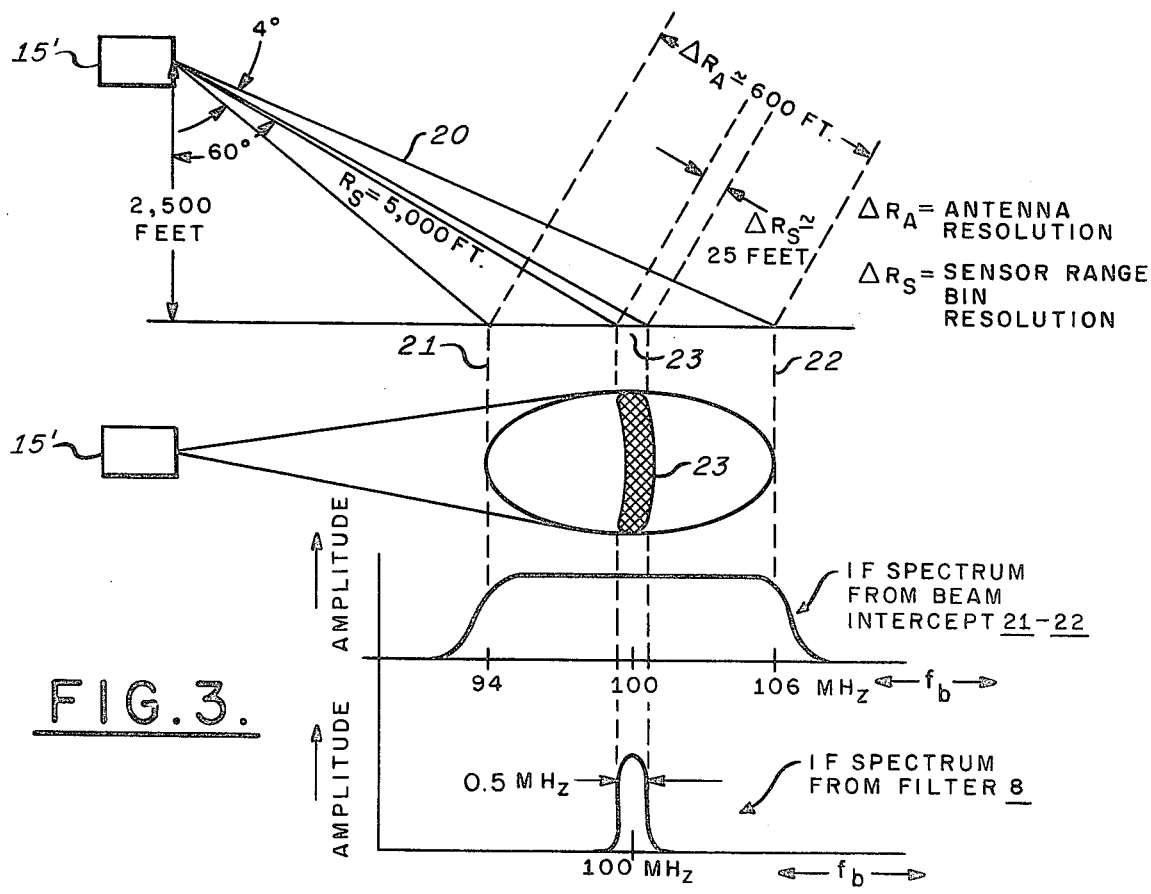
FIG. 3 illustrates operating characteristics of the invention further augmented by elevation and plan diagrams showing its operating conditions.

The basis for clutter rejection by the range bin system is illustrated in FIG. 3 for the case wherein a 3.5° antenna pattern 20 of the radiometer 15' intercepts a 600 foot $\Delta R_A$ increment 21 to 22 of the ground. The i.f. beat frequency is 94 MHz from the lower edge of the antenna pattern 20 at 21 and is 106 MHz from the higher edge of the pattern 20 at 22. With a narrow band i.f. filter 8 centered at 100 MHz, the receiver system will pass signals only from the central area 23 of the antenna pattern as depicted in FIG. 3. The invention will be seen to relate to a seeker system configuration which has both open and closed loop control of the modulation frequency $f_m$. According to the invention, the i.f. signal is processed in multiple bins to achieve range search, target acquisition, and range tracking capabilities.

Figure 4:
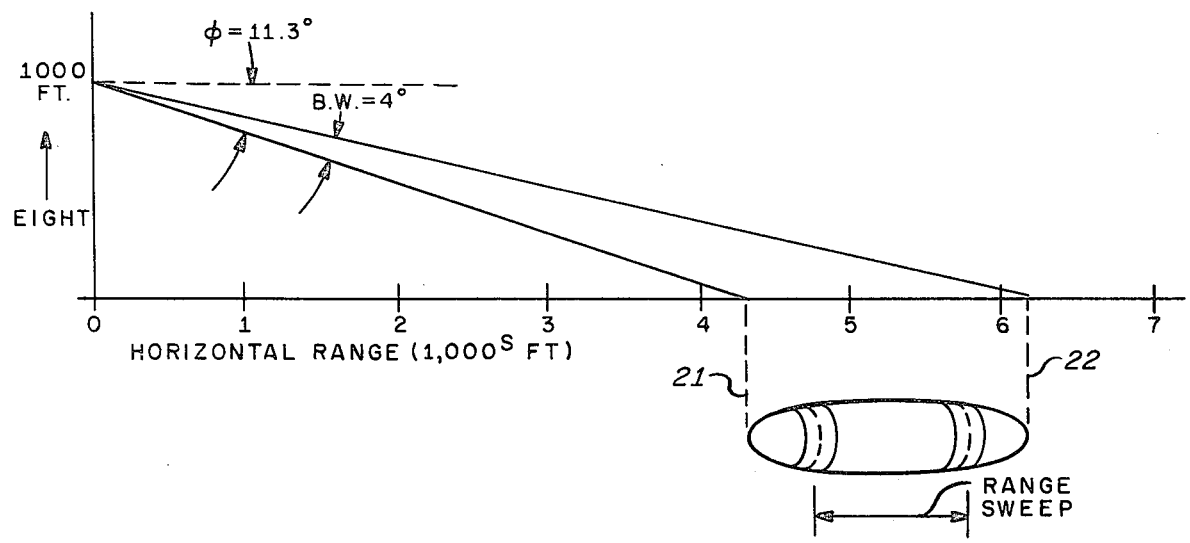
FIGS. 4 and 5 are similar to FIG. 3 and are useful in explaining operation of the invention.
Figure 5:
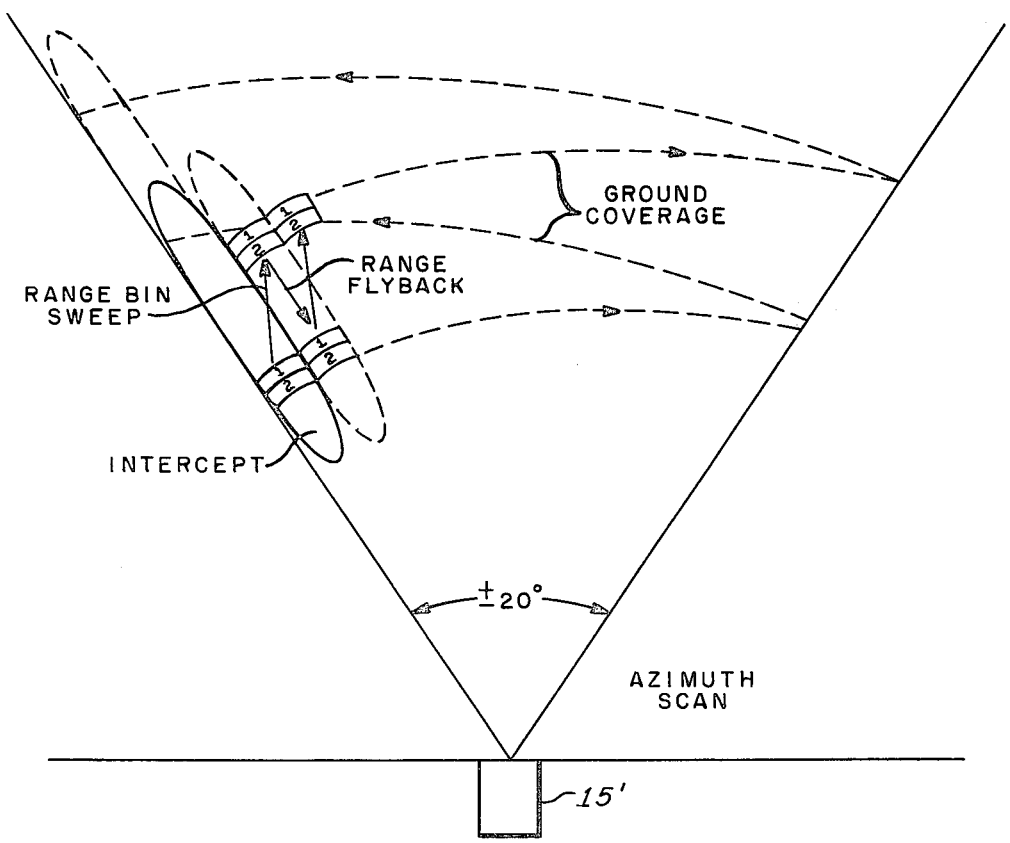

In one typical lower altitude application, the novel radiometer system 15' is flown at a generally constant altitude, scanning in both range and azimuth (FIGS. 4 and 5). Once the seeker system detects a target at a typical range of 5000 feet, it switches automatically to a tracking mode in which the target is held within the antenna pattern intercept range increment 23 by the range bin device and in angle by the antenna gimbal servos, while line of sight rate guidance signals may be provided to the craft servos to fly an intercept course to the target, if desired. The antenna is azimuth scanned in angle ±20° as shown in FIG. 5 at, say, a 0.25 Hz rate. The dual range bins are scanned in range from 4600 to 5600 feet at a 5 Hertz rate, for example. This provides complete ground coverage while the craft flies a near-level horizontal path. The antenna pattern ground intercept 21-22 is approximately 2000 feet along the flight track, but the range bins provide a range resolution of 0.5 percent of the slant range, or 25 feet at a 5000 feet slant range, which is approximately the size of the target normally to be acquired. The range scan rate of 5 Hertz produces a dwell time on the target of 5 milliseconds, readily providing a sufficient signal-to-noise ratio for acquisition. It will be understood by those skilled in the art that the invention is not limited to use in the particular situation described in the foregoing example and that it may be employed in a wide range of applications. In the general event, the novel seeker has two basic functions to perform. The seeker must first search and detect the presence of a point target within the antenna pattern 20. Secondly, the seeker must then switch to a closed loop tracking mode of operation to maintain the target within the antenna field of view. It may also then in certain applications provide line of sight steering commands to the craft guidance control system.

Figure 6A:
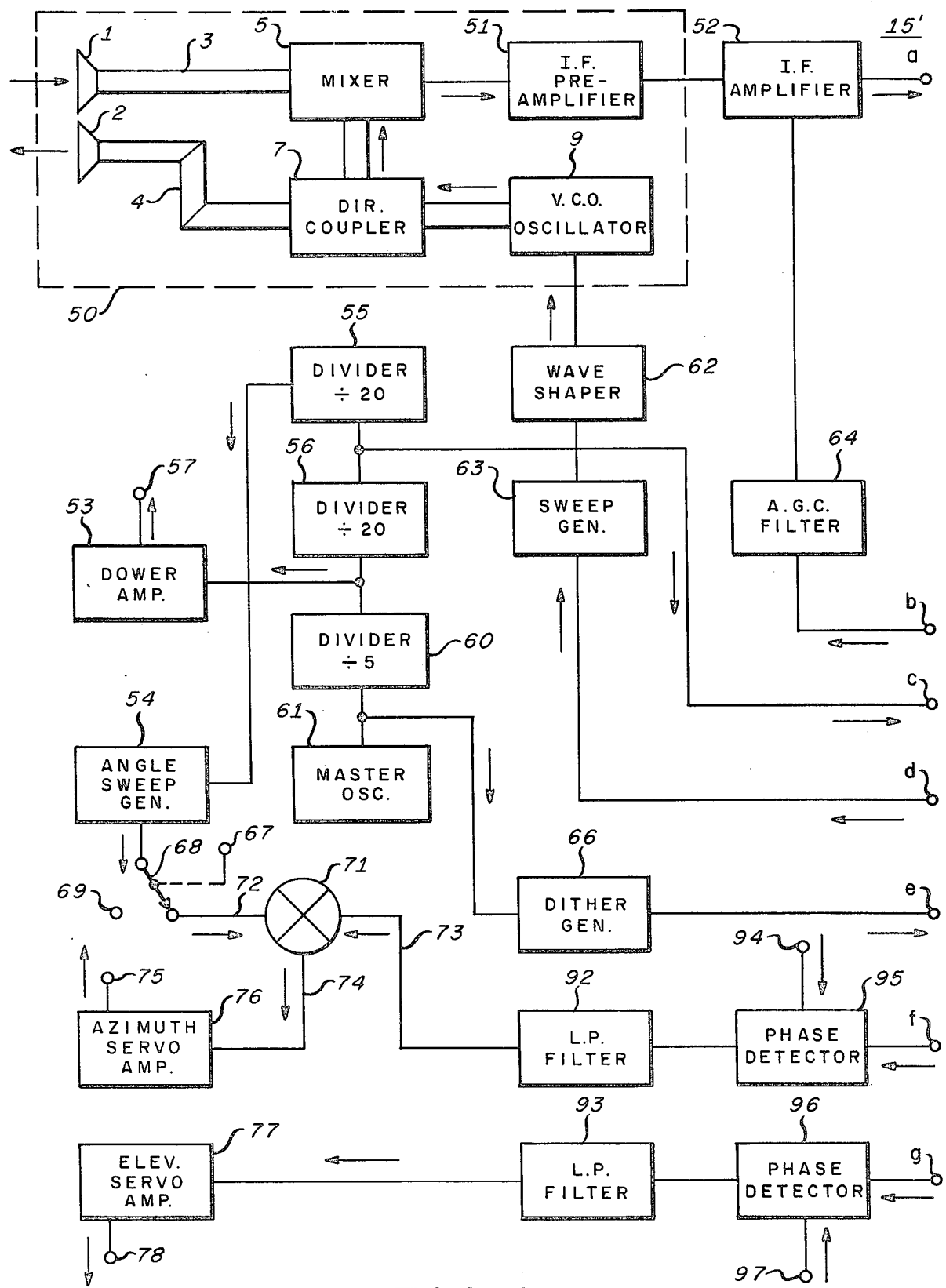
FIGS. 6A and 6B are companion block diagrams of the invention showing components of the invention and their electrical interconnections.
Figure 6B:
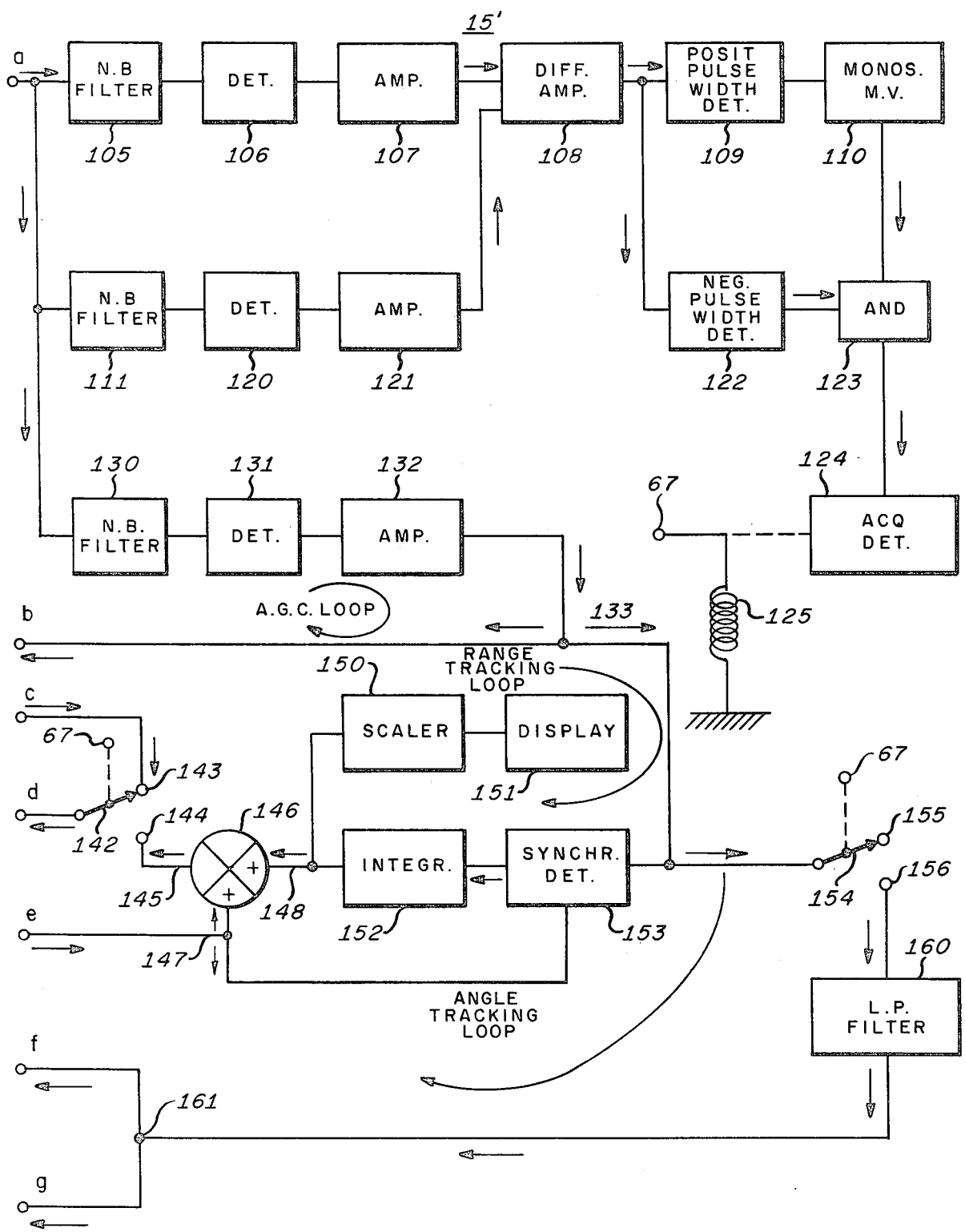
Figure 7:
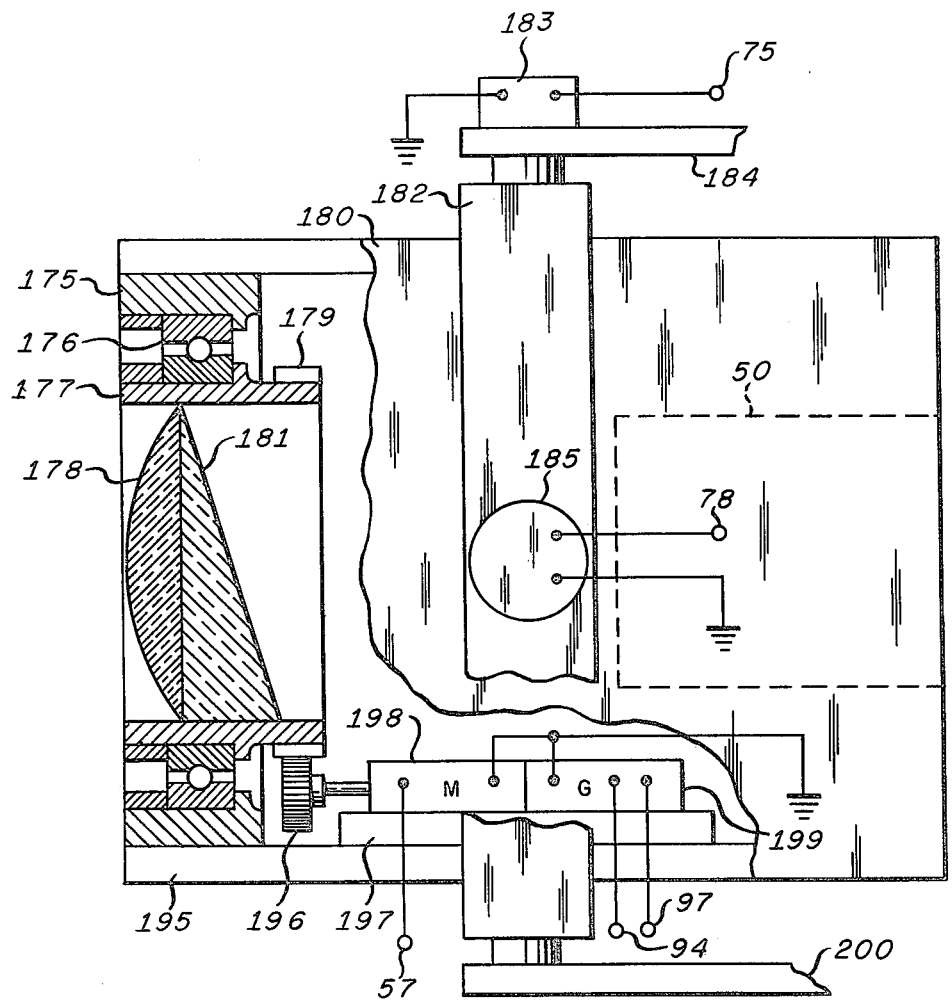
FIG. 7 is an elevation view in partial cross section illustrating an antenna useful in the apparatus of FIG. 6A.

The preferred antenna for the system is illustrated in FIG. 6A and in more detail in FIG. 7. It will be seen that the antenna employed in the invention may be of generally conventional nature, being of the kind that is known in the prior art for selective searching and tracking, therefore, making any detailed description of the physical structure of the antenna unnecessary here. The antenna drive and gimbal support system may be of the general type disclosed, for instance, in the L. A. Maybarduk et al U.S. Pat. No. 2,410,831, issued Nov. 12, 1946 for a "Scanning Device" and assigned to Sperry Rand Corporation. In particular, the antenna system may use features of the scanning antenna of the W. W. Hansen U.S. Pat. No. 2,571,129 for a "Scanning Antenna Device," issued Oct. 16, 1951 or of the related scanning system of the R. V. Gould U.S. Pat. No. 3,226,721 for a "Scanning Antenna Utilizing Four Rotary Prisms to Produce Rectilinear Scan and Fifth Rotary Prism to Produce Conical Scan," issued Dec. 28, 1965, both patents being assigned to Sperry Rand Corporation.

The transmitter receiver 50 of FIGS. 6A and 7 illustrates the antenna as including wave guides 3 and 4 and associated horns 1 and 2 respectively for reception and transmission. The dual horns 1, 2 provide reception and transmission antenna patterns that are coincident to within less than one tenth of their widths and provide the required receiver isolation. Lens 178 (FIG. 7) serves to collimate both patterns, while prism 181 cyclically deflects them when prism 181 is rotated, so that conical scan is effected. The dielectric lens 178 is conveniently mounted in the same rotatable circular frame 177 as is the prism 181, frame 177 being journalled in a bearing 176 in the frontal member 175 forming part of enclosure 180. Rotation of prism 181 and conical scan of the antenna patterns is effected when synchronous motor 198, which may include step-up gearing, drives the rotatable frame 177 through gearing 179, 196. Rotation of the antenna patterns about one half of a pattern-width off boresight produces the conventional conical scan modulation of the received energy necessary to provide closed-loop automatic tracking. A two-phase generator 199 is connected to the motor 198 shaft so that two quadrature signals are generated that are synchronized to the antenna conical scan and that can be used as reference signals to demodulate the received signal. They appear at terminals 94, 97, while the motor 198 driving voltage is applied at terminal 57. Motor 198 and generator 199 are located in a common base 197 on the platform floor 195 of enclosure 180.

The antenna, including the transmitter-receiver 50 and refractor elements 178, 181, is mounted within a convenient enclosure 180 and is supported in a gimbal system from the craft frame, as at 184 to 200. The support includes a gimbal 182 mounted for rotation about a normally vertical axis, its azimuth position being determined by servo motor 183 fed at terminal 75 by a suitable control signal generated as will be explained. Housing 180 is journalled about a normally horizontal axis within gimbal 182, its position being determined by servo motor 185 according to control signals applied at terminal 78 as will be further explained.

The modulation frequency $f_m$ applied to oscillator 9, the antenna conical scan rate, and the various sweep frequencies are all locked together in phase and frequency under the control of a common source as seen in FIG. 6A so as beneficially to eliminate cross talk and beat frequencies within the system. A master clock oscillator 61 operates at 500 Hertz and provides a reference frequency to the dither generator 66. The clock frequency is divided by five in divider 60 to produce a 100 Hertz reference which synchronizes the drive through the power amplifier 53 of the conical scan motor 198. The 100 Hertz reference is divided again by 20 in divider 56 to produce the 5 Hertz reference signal for synchronizing the range search saw tooth sweep generator 63b during range search. Finally, the reference is divided again by 20 in divider 55 that produces a 0.25 Hertz reference used to synchronize the angle sweep generator 54.

The transmitter for the system is a 35 GHz low power (typically 100 mw) electronically tunable Gunn oscillator 9, for example, which is continuously modulated in frequency over an r.f. band of approximately 1000 MHz by sweep generator 63. The transmitter power is fed through a coupler 7 to the transmit feed 2 and through the antenna elements 178, 181. The transmitted energy reflected from the target back toward the system is received through the antenna and the receiver wave guide 3 at the input of mixer 5. A small portion of the signal to be transmitted is coupled through coupler 7 to the local oscillator input of mixer 5. The received and transmitter signals are then mixed and their difference or beat frequency appears as the i.f. output for supply to i.f. preamplifier 51.

The mixer output is amplified in the low noise i.f. preamplifier 51 and is fed to an i.f. amplifier 52 which contains a conventional voltage-controlled amplifier used in setting the receiver gain in an automatic gain control loop. The output of i.f. amplifier 52 feeds three narrow-band i.f. range bin filters with respective center frequencies of 100.0, 100.5 and 101.0 MHz. Each filter has a 0.5 MHz band width and may be a conventional surface wave acoustic filter. The outputs of the filters 105, 111, 130 are detected and amplified in video amplifiers which have an output band width typically of 10 KHz. For this purpose, the respective acoustic surface wave filters 105, 111, 130 are coupled in series with cooperating detectors 106, 120, 131 and amplifiers 107, 121, 132. The outputs of the 101.0 and 100.5 MHz channel amplifiers 107, 121 are fed into a difference amplifier 108 which subtracts the instantaneous voltages of each range bin and effectively cancels any clutter present. Since the two range bins are only 25 feet displaced along the ground at the 5000 foot range, for example, the effective clutter return in each bin is substantially the same. Hence, the difference amplifier 108 output is nearly zero until a point target enters one of the range bin channels.

Figure 9:
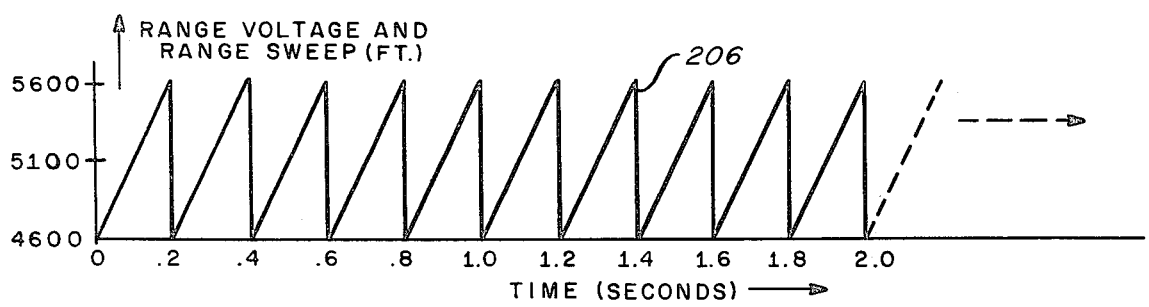
Figure 10:
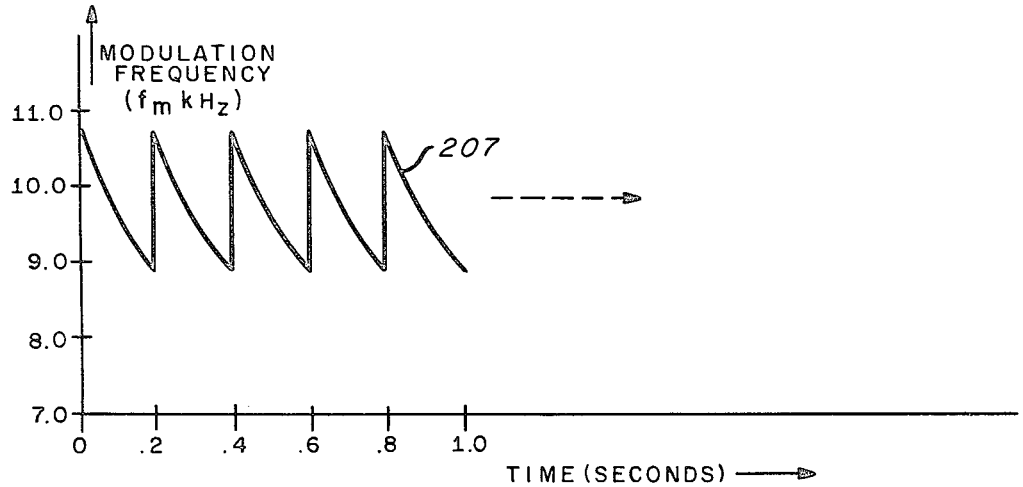

The instantaneous range at which the range bins are searched is inversely proportional to the modulation frequency $f_m$ applied to oscillator 9 by virtue of the function of VCO saw tooth sweep generator 63. In the search and track modes, a linear saw tooth wave form is supplied by generator 63. The basic FMCW range equation for a saw tooth modulation wave form is:

$$R = cf_b/2\Delta f f_m$$

where:
c = speed of light (9.84 × 10⁸ ft/sec.),
$f_b$ = center frequency of the fixed range bin filters (100 MHz), and
Δf = a constant r.f. sweep deviation (1 GHz).
To produce a range bin scan, the modulation frequency $f_m$ is varied at a slow rate of 5 Hz. To sweep the range R linearly from 4600 to 5600 feet as indicated in FIG. 9, the modulation frequency is varied non-linearly from 10.7 KHz to 8.8 KHz as shown in FIG. 10. Note that FIG. 10 is not the output wave form of VCO saw tooth generator 63, but rather shows how the modulation frequency is controlled as a function of time in order to produce the linear range sweep. The output wave form of VCO saw tooth generator 63 is a linear saw tooth which is directly converted by the VCO oscillator 9 to produce the r.f. sweep (34.5 to 35.5 GHz) shown as wave form 210 in FIG. 11. The period of the 100 GHz r.f. sweep is 1/10.7 KHz or 93.5 microseconds at the start of the range sweep; at the end of the range sweep, the period of the r.f. sweep is 1/8.8 KHz or 113.6 microseconds. The conventional wave shaper 62 is used only to compensate for any non-linearity of the high frequency VCO oscillator 9. Thus, the range sweep signal varies the modulation signal $f_m$ about its nominal value and causes the range bins effectively to scan from 4600 feet to 5600 feet at a 5 Hz rate, hence producing a target signature wave form necessary for use in the acquisition detector 124. The range sweep is a saw tooth wave so that the two acquisition bins always cross a target in the same sequence and generate the proper bipolar pulse in difference amplifier 108 in the presence of a target.

Figure 16:
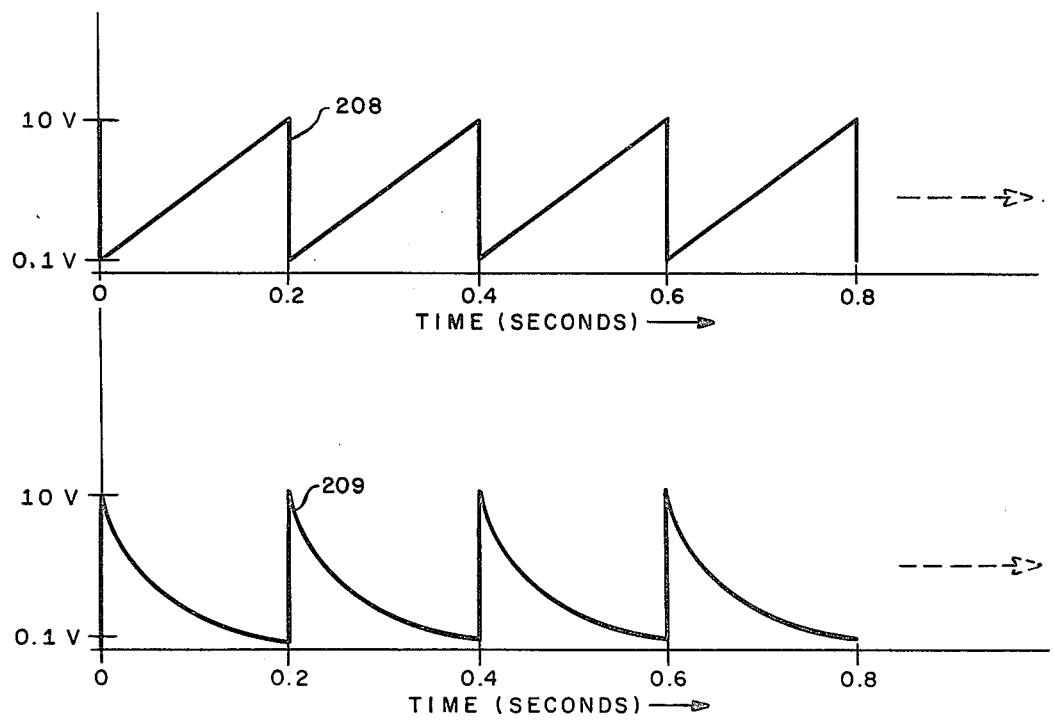

Saw tooth generator 63b, synchronously responsive to the output of frequency divider 56, is provided to generate the aforementioned 5 Hz range sweep voltage applied to VCO saw tooth generator 63. The wave form 208 generated by saw tooth generator 63b is connected through the conventional signal inverter 63c, whose output 209 is shown in FIG. 16. Wave 209 is fed through switch 142 to VCO saw tooth generator 63, which then directly generates the required non-linear change in modulation frequency $f_m$ shown in FIG. 10.

Figure 8:
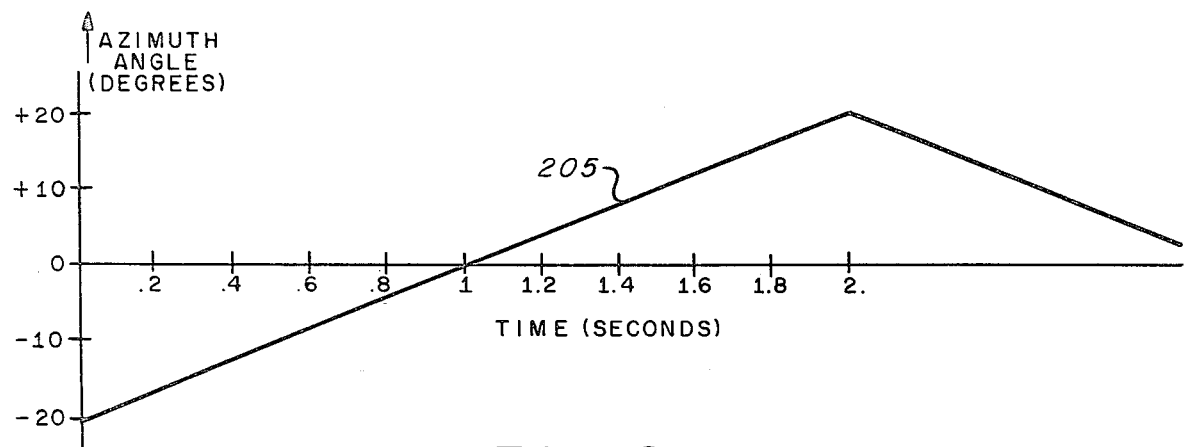
FIGS. 8 through 16 illustrate signal wave forms and are useful in explaining the operation of the invention as illustrated in FIGS. 6A and 6B.

Angle sweep generator 54, driven also by master oscillator 61 through dividers 60, 56, and 55, produces the triangular sweep voltage 205 of FIG. 8 for supply to the azimuth gimbal servo amplifier 76 through switch 68 and summation device 71. The amplifier 76 output at terminal 75 is connected to azimuth drive motor 183 (FIG. 7). The magnitude of the azimuth sweep of gimbal 182 is proportional to the amplitude of wave 205.

The difference amplifier 108, acquisition detector 124, and associated elements 109, 110, 122, 123 are concerned with acquiring a target, once detected during the search modes by operating the mechanical link 67 which has three functions yet to be described. The output of difference amplifier 108 is fed in parallel to a conventional positive pulse width detector 109 and a functionally similar but negative pulse width detector 122. Any signal detected by circuit 109 is, in effect, delayed by monostable multivibrator 110 whose output is coupled to AND gate 123. The other input to AND gate 123 is the output of the negative detector 122. Detectors 109, 122 are designed to be responsive to pulses of similar duration. When such pulses generate an output from detectors 109, 122, acquisition detector 124 is operated, actuating link 67 which may be either a mechanical or an electrical link adapted for operating the various switches 68, 142, and 154.

Figure 11:
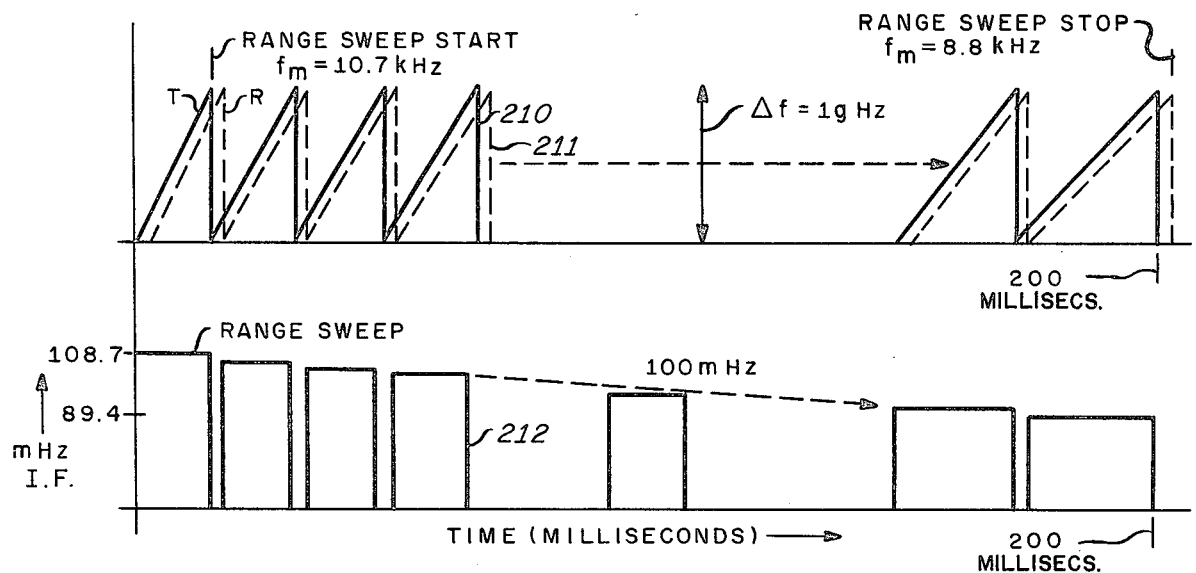
Figure 12:
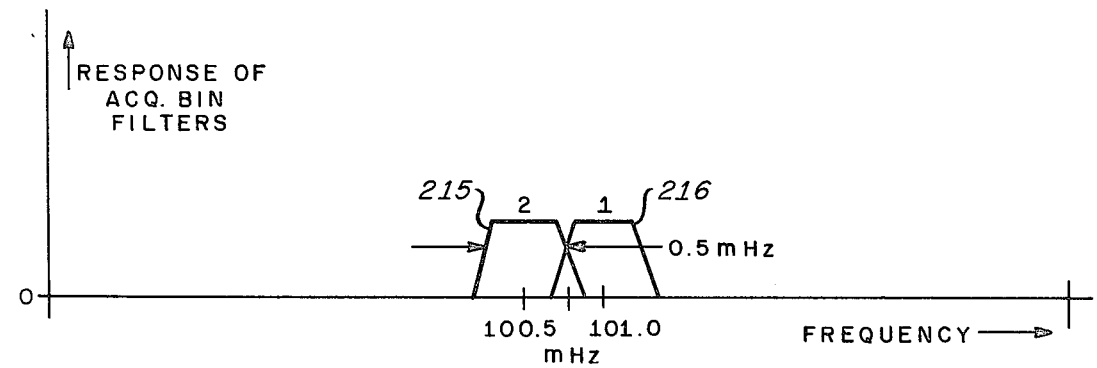
Figure 13:
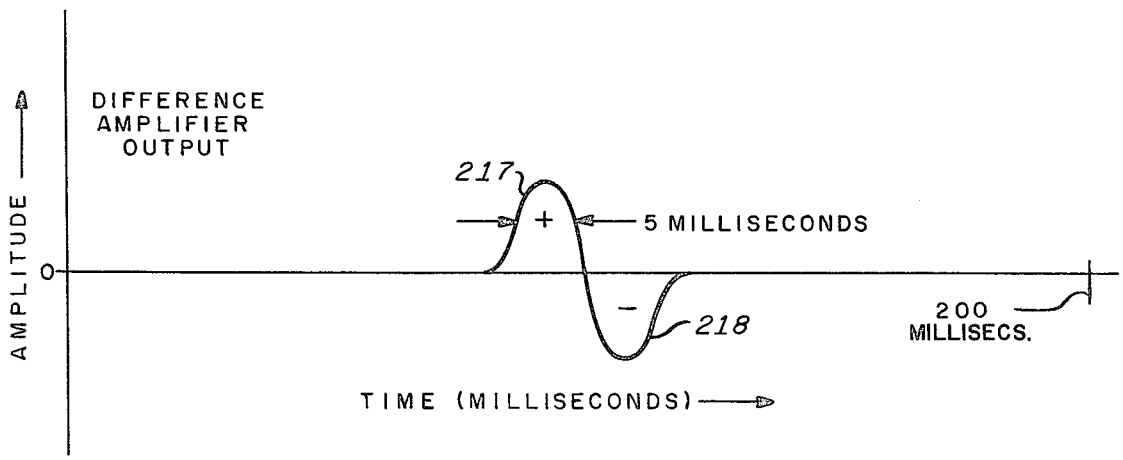

The output of difference amplifier 108 goes positive as a target enters the first range bin. The output goes to zero as the target passes between the bins and finally becomes negative as the target moves through the second bin. FIGS. 11,12 and 13 show the wave forms that occur during this phase. FIG. 11 shows the transmit (T) and receive (R) wave forms 210, 211 as a function of time. The i.f. output 212 of mixer 5 as seen in FIG. 11 is the difference between frequencies T and R. As the bins are swept in range, the i.f. frequency generated by a target at 5000 feet moves progressively from 108.7 MHz to 89.4 MHz. The response characteristics 215, 216 of the two acquisition range bins are shown in FIG. 12 and are fixed at 100.5 and 101.0 MHz. As the i.f. frequency from the target approaches 101.0 MHz, the output 217 of the difference amplifier 108 begins to go positive, as shown in FIG. 13. As the frequency sweeps through the 100.5 MHz filter, the output response 218 of the difference amplifier 108 then goes negative.

The bipolar wave form 217, 218 is characteristic of a point target. Due to the range scan speed and direction, the positive half 217 of the wave is always first and is 5 milliseconds wide and is followed immediately by the negative half 218 of the wave. The output of the difference amplifier 108 feeds the positive and negative pulse width detectors 109,122 so that the half-pulse width for the point target must be 5 milliseconds or no output results from AND gate 123. When the positive half wave 217 is detected, the positive pulse width detector 109 emits a short pulse (approximately 10 microseconds). The output of the positive detector 109 triggers the one shot monostable multivibrator 110, which stretches the input pulse to 5 milliseconds and feeds the stretched pulse to AND gate 123. The output of negative pulse detector 122 also feeds AND gate 123. If the negative pulse width detector 122 emits a pulse during the 5 milliseconds after the positive pulse, the output of AND gate 123 changes to activate acquisition detector 124; this initiates closed loop automatic tracking. If the negative pulse 218 is not detected during the proper time interval, the one shot multivibrator 110 returns to its original state and remains there until a new positive pulse 217 is detected. A terrain boundary or a target larger than the range bin will produce a positive or negative pulse greater than 5 milliseconds duration, and does not trigger acquisition circuit 124. Consequently, this technique provides a novel and simple method of processing the received signal to reject the returns from terrain boundaries or from targets larger than a predetermined size in the search area. Only small substantially point targets produce the predetermined wave form required to trigger acquisition circuit 124.

Figure 15:
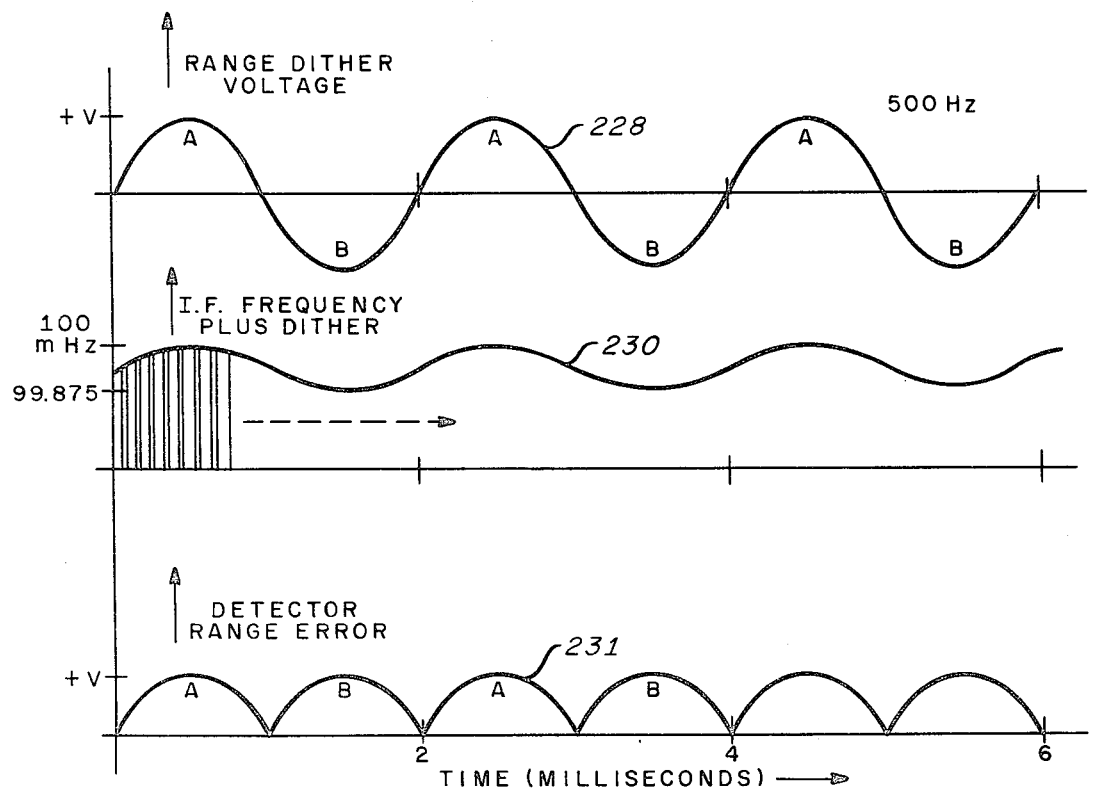

The acquisition detector 124 in effect generates a search-to-track transfer command upon detecting a target which has passed through the acquisition range bins. This command changes switches 68, 142, 154 from the search to the track mode. At this point, the target has passed from the 100.5 MHz range bin into the 100.0 MHz bin, which now acts as the tracking range bin. The operation involves passage of the output of i.f. amplifier 52 into narrow band filter 130, detector 131, and amplifier 132 to junction 133, elements 130, 131, and 132 being generally similar to narrow band filters 105, 111, detectors 106, 120, and amplifiers 107, 121. The search scan in range is terminated, since there is no longer an input from terminal 143 through switch 142 from master oscillator 61. Also, azimuth scan of the antenna ends with switch 68 moved from terminal 70 to the blank terminal 69; accordingly, there is no input from generator 54 passing through switch 68 and into input 72 of summation device 71. Instead, the 500 Hz dither voltage 228 of FIG. 15 is then fed by dither generator 66 to the input 147 of summation device 146 and flows from output 145 through terminal 144 and switch 142 to frequency modulate the output of oscillator 9. As a consequence, the tracking bin dithers over the target by approximately a quarter of the range bin width. Waves 230 and 231 of FIG. 15 respectively represent the dithered i.f. frequency at the output of i.f. amplifier 52 and the detected range error at the output of synchronous detector 153.

Figure 14:
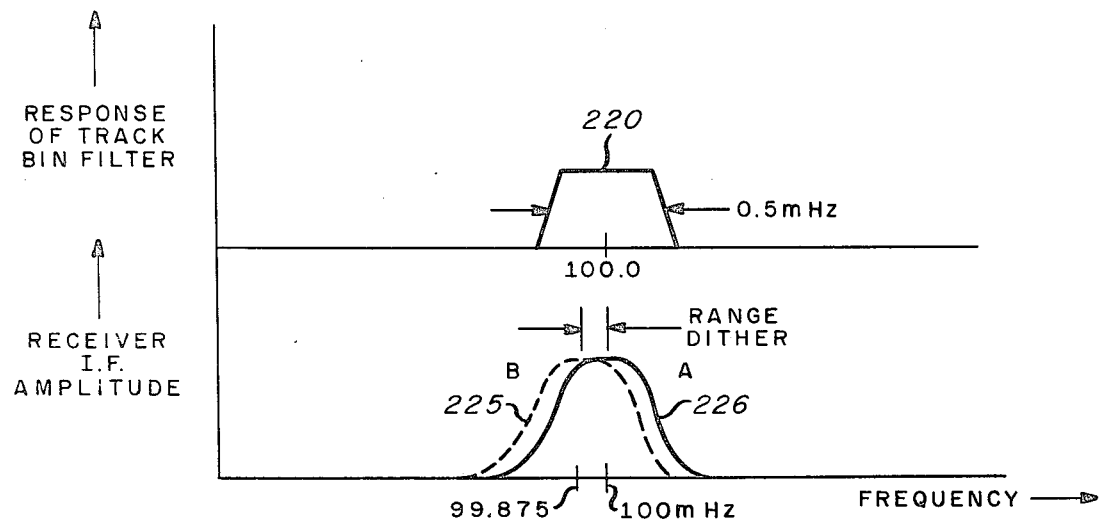

In FIG. 14, the frequency response 220 of the range bin filter circuit including elements 130, 131, 132 is illustrated, while at 225 and 226 are illustrated the received and dithered target i.f. signals for a target just slightly beyond 5,000 feet. FIG. 15 shows waves 230 which is, as noted in the foregoing, the time response of the dithered target signal. The received signal is passed through the tracking bin circuit 130, 131, 132, being detected and then amplified in amplifier 132. This output at 133 feeds the video signal containing the 500 Hz dither and conical scan modulations to the synchronous detector 153 in the range tracking loop and to switch blade 154. The detected signal is demodulated as seen at wave 231 in FIG. 15 with respect to the output of dither generator 66 to generate a bipolar error signal dependent on the target being at a shorter or longer range than the true center of the range bin. This error voltage is fed to tracking integrator 152 and to saw tooth generator 63. The integrated range error voltage is transferred through the input 148 of summation device 146, output lead 145, terminal 144, and switch 142 to sweep circuit 63. The integrated range error voltage forces the range tracking loop to drive the error voltage output of synchronous detector 153 to zero, hence centering the target in the range tracking bin. Consequently, as the target seeker closes in on the selected target, the modulation frequency is continuously increased to keep the target in the center of the range tracking bin. The integrator 152 output voltage is, in some applications, supplied to a conventional divider/scaler amplifier 150 to produce a voltage which is directly proportional to the target slant range. This voltage may be applied to a conventional display 151 for directly indicating slant range or may be applied to other utilization equipment.

The signal at junction 133 has two additional functions during the automatic tracking mode of the apparatus. First, the signal is then coupled through switch 154 and terminal 156 into low pass filter 160 and junction 161; gimbal tracking is accomplished by feeding the output of the range tracking bin amplifier 132 into low pass filter 160 in the antenna angle tracking loop. Filter 160 removes the higher frequency modulation (500 Hz) and passes only the conical scan modulation (100 Hz), which is then fed to conventional azimuth and elevation error detectors 95, 96. The detectors 95, 96 demodulate the conical scan modulation into components around the azimuth and elevation axes of the antenna system, the conical span reference voltages being supplied at terminals 94, 97 from spin reference generator 199 (FIG. 7). The low pass filters 92, 93 following detectors 95, 96 remove ripple and produce variable polarity voltages proportional to the angular error between the antenna line of sight and the target line of sight. the azimuth error voltage is fed (73, 71, 74) to the azimuth gimbal servo 76 and the elevation error voltage is fed to the elevation servo 77 to reposition the antenna so as to drive the error voltages to zero. The antenna is thus continuously repositioned so that the target remains at the conical scan boresight. It will be understood by those skilled in the art that the azimuth and elevation tracking function may be practiced in the general manner previously employed widely in automatic tracking radar systems and in radiometric systems, for example, of the kind disclosed in the R. S. Roeder et al U.S. Pat. No. 3,883,876 for a "High Frequency Radiometric Target Seeking and Tracking Apparatus," issued May 13, 1975 and assigned to Sperry Rand Corporation; reference may also be had to the R. E. Lazarchik et al U.S. Pat. No. 3,787,857 for a "Dual Mode Radiometric System," issued Jan. 22, 1974 and also assigned to Sperry Rand Corporation.

The output of the tracking range bin amplifier at junction 133 is also fed to the automatic gain control loop. The a.g.c. filter 64 averages the modulation signals to produce a unidirectional voltage proportional to received power in the tracking range bin amplifier 132 which is a measure of actual target power. This voltage is used to set the i.f. gain in the i.f. amplifier 52 to obtain optimum performance and to maintain tracking loop stability. Manual control may be exercised over linkage 67 to return the apparatus to its search mode should a target be lost in the tracking mode of selection of a new target be desired. Automatic means for performing the same function will be readily apparent to those skilled in the art. For example, spring 125 is representative of mechanisms which may be used to re-institute target search in range and azimuth by moving switches 68, 142, 154 back to their respective terminals 70, 143, 155.

Accordingly, it is seen that the invention is a novel continuous-wave frequency-modulation radiometric target seeking system having search, acquisition, and tracking facilities. The invention employs a linear, wide-r.f.-band target range bin technique with the i.f. signal energy contained in high harmonic numbers of the modulation frequency. A selected deviation $\alpha f$ minimizes the effects of multipath, glint, and scintillation. The modulation frequency $f_m$ is selectively controlled to produce a high, constant i.f. difference frequency in the receiver. The high i.f. frequency beneficially provides high transmitter-to-receiver isolation, and is chosen not to exceed ten percent of the r.f. deviation so that processing loss during range sweep turn-around is minimized. For a modulation frequency $f_m$ of 10 KHz, a point target at 5000 feet, for example, will produce a narrow i.f. spectrum at 100 MHz consisting of lines spaced 10 KHz apart. In this case, the target energy is contained in a limited number of harmonics of the modulation frequency with a center harmonic number of 100 MHz/10 KHz or $10 \times 10^3$. Narrow band surface acoustic wave filters 105, 111, 130 are used to form range bins with band widths selected to be compatible with the r.f. sweep linearity. The narrow band filters pass only those i.f. frequencies contained in a narrow range window and this is the beneficial basis of both background and rain clutter rejection. Additionally, the filters reduce the effective receiver noise band width over previous techniques without sacrifice in the signal smoothing effects of the wide r.f. band width. Simultaneous range and angle sweep are accomplished with two adjacent range bin channels along with gimbal scanning to provide forward ground coverage consistent with craft cruise velocity. The range sweep generator 63 changes the modulation frequency $f_m$ effectively to sweep the range bins along the ground track within the antenna pattern 20, while a synchronous lower frequency angle sweep generator 54 drives the azimuth gimbal 182. The range bin resolution is made close to target size to achieve maximum clutter rejection. Simultaneous range and angle sweep provides for continuous search coverage without excessive scan overlap and also assures that no random beat frequencies are produced in the receiver. It will be noted that those skilled in the art that a greater number of range bins could be used where a higher search rate is required along with improved sensitivity; however, two search bins with the acquisition features described in the foregoing provide a simple and effective system.

Two significantly beneficial features of the novel acquisition processor are clutter cancellation and target signature discrimination. With the first feature, a difference amplifier 108 is used to subtract the first bin detected video signal from the second bin video. Since the two range bins provide adjacent range cell intercepts at the ground, spatial clutter of the same type is eliminated from the output of amplifier 108. The target signature from the difference amplifier 108 is distinctive in that the output is a known derivative response, i.e., the signal appears as an approximate sine wave of one cycle duration. The time period of the signal is a direct function of the range sweep rate and its positive and negative half cycles are of nearly the same magnitude and width. The second feature of the processor is the bipolar pulse width discriminator which is designed to recognize the response of the target signature. Two parallel channels are used, one with a positive pulse width detector 109 followed by a multivibrator delay circuit 110 and' the other a negative pulse width detector 122. The two channel outputs are then combined in a coincidence circuit 123. If the incoming target signature has both the proper polarity and a width equal to the bipolar discriminator characteristic, the signal activates the acquisition detector 124. The processing circuit provides a high degree of discrimination against terrain boundaries or areas with larger dimensions than the range bin resolution. This type of terrain is to be ignored and provides a single polarity pulse with twice the width of the bipolar detectors; thus it is advantageously rejected by the novel processor.

Range tracking is accomplished through a third range bin channel 130, 131, 132. The third channel bin is placed behind the two acquisition bins (the third bin is at the shortest range and its i.f. filter 130 is at the lowest frequency) such that the target falls within the third bin only after acquistion. A novel technique of range tracking is achieved by injecting the output a high frequency dither device 66 synchronized with the conical scan frequency upon the modulation frequency $f_m$. The target amplitude modulation is then passed through the third fixed-tuned filter 130, is synchronously detected at 153, and is used to provide closed loop control of the modulation frequency $f_m$. Another feature of the range tracking system is that an automatic gain control signal is derived by filtering the composite amplitude modulation of the signal received through the third range bin. This signal is then fed back to regulate the i.f. gain. This is a simpler automatic gain control technique than the target-derived control used in previous f.m.-c.w. seekers and is used because the tracking bin filter reduces the unwanted background clutter.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. In a high frequency target detector system having antenna means for conically scanning about a boresight direction and coupled to receiver means:

transmitter carrier oscillator means coupled to said antenna means and to said receiver means,
   master oscillator means,
   drive means responsive to said master oscillator means for conically scanning said antenna means at a first rate,
   sweep generator means responsive to said master oscillator means for frequency modulating said transmitter carrier at a second rate,
   azimuth motive means responsive to said master oscillator means for cylically sector scanning said antenna means in azimuth at a third rate,
   said sweep generator means, said azimuth motive means, and said conical scanning of said antenna means being operated in synchronous relation, and
   utilization means coupled to the output of said receiver means.

2. Apparatus as described in claim 1 additionally including:
   target acquisition signal processor means responsive to said receiver means, and
   target detector means responsive to said target acquisition signal processor means.

3. Apparatus as described in claim 2 wherein said target acquisition signal processor means includes at least:
   first and second narrow band filter means responsive to said receiver means and having substantially contiguous pass bands;
   first and second detector means respectively responsive to said first and second narrow band filter means, and
   difference amplifier means responsive to said first and second detector means in the presence of a desired target by producing an output having a first polarity portion immediately followed by an opposite polarity portion.

4. Apparatus as described in claim 3 wherein said first polarity portion and said opposite polarity portion are of substantially equal time duration.

5. Apparatus as described in claim 3 wherein said target acquisition signal processor means additionally includes;
   first pulse detector means responsive to said first polarity portion,
   delay means responsive to said first pulse detector means,
   second pulse detector means responsive to said second polarity means, and
   gate means responsive to the simultaneous presence of outputs from said delay means and from said second pulse detector means by generation of a coincidence signal,
   said target detector means being responsive to said gate means coincidence signal whereby target acquisition is initiated.

6. Apparatus as described in claim 5 wherein:
   first frequency divider means responsive to said master oscillator means determines said first rate,
   second frequency divider means responsive to said first frequency divider means determines said second rate, and
   third frequency divider means responsive to said second frequency divider means determines said third rate.

7. Apparatus as decribed in claim 5 additionally including:
   third narrow band filter means responsive to said receiver means and having a pass band contiguous with the pass band of said second narrow band filter means and opposite the pass band of said first narrow band filter means,
   third detector means responsive to said third narrow band filter means,
   target range tracking means responsive to said third detector means, and switch means responsive to said target detector means for disconnecting the output of said sweep generator means from said transmitter carrier oscillator means,
said switch means including means for connecting the output of said target range tracking means to control the frequency of said transmitter carrier oscillator means.

8. Apparatus as described in claim 7 wherein said target range tracking means includes:
synchronous detector means responsive to said third detector means, and
integrator means responsive to said synchronous detector means.

9. Apparatus as described in claim 8 additionally including:
dither oscillator means responsive directly to said master oscillator means, and
summation means for adding the outputs of said integrator means and said dither oscillator means from control of the frequency of said transmitter carrier oscillator means.

10. Apparatus as described in claim 5 additionally including:
third narrow band filter means responsive to said receiver means and having a pass band contiguous with the pass band of said second narrow band filter means and opposite the pass band of said first narrow band filter means,
third detector means responsive to said third narrow band filter means,
elevation and azimuth angle error detector means selectively responsive to said third detector means,
first switch means responsive to said target detector means for discontinuing said cyclic sector scanning of said antenna means in azimuth, and
second switch means also responsive to said target detector means for coupling the output of said third detector means to said elevation and azimuth error angle detector means for automatic tracking by said antenna means of said target in azimuth and elevation.

11. Apparatus as described in claim 10 wherein the band widths of said first, second, and third narrow band filter means are substantially equal.

12. Apparatus as described in claim 10 further including quadrature phase reference generator means driven in synchronism by said drive means for furnishing quadrature conical scan reference voltages to said respective elevation and azimuth angle error detector means.

13. In a high frequency target detector system having antenna means for conically scanning about a boresight direction and coupled to receiver means:
transmitter carrier oscillator means coupled to said antenna means and to said receiver means,
master oscillator means,
drive means responsive to said master oscillator means for conically scanning said antenna means at a first rate,
sweep generator means responsive to said master oscillator means for frequency modulating said transmitter carrier at a second rate,
azimuth motive means responsive to said master oscillator means for cyclically sector scanning said antenna means in azimuth at a third rate,
said sweep generator means, said azimuth motive means, and said conical scanning of said antenna means being operated in synchronous relation,
target acquisition signal processor means responsive to said receiver means, and
target detector means responsive to said target acquisition signal processor means,
said target acquisition signal processor including at least:
first and second narrow band filter means responsive to said receiver means and having substantially contiguous pass bands;
first and second detector means respectively responsive to said first and second narrow band filter means, and
difference amplifier means responsive to said first and second detector means in the presence of a desired target by producing an output having a first polarity portion immediately followed by an opposite polarity portion,
first pulse detector means responsive to said first polarity portion,
delay means responsive to said first pulse detector means,
second pulse detector means responsive to said second polarity means, and
gate means responsive to the simultaneous presence of outputs from said delay mmeans and from said second pulse detector means by generation of a coincidence signal, and
said target detector means being responsive to said gate means coincidence signal whereby target acquisition is initiated,
said target acquisition signal processor additionally including:
third narrow band filter means responsive to said receiver means and having a pass band contiguous with the pass band of said second narrow band filter means and opposite the pass band of said first narrow band filter means,
third detector means responsive to said third narrow band filter means, and
control means responsive to said third detector means for controlling the gain of at least a portion of said receiver means in the presence of an output from said third detector means.

* * * * *